United States Patent [19]
Roberts

[11] Patent Number: 5,299,279
[45] Date of Patent: Mar. 29, 1994

[54] SHORT ARC LAMP SOLDERING DEVICE
[75] Inventor: Roy D. Roberts, Newark, Calif.
[73] Assignee: ILC Technology, Inc., Sunnyvale, Calif.
[21] Appl. No.: 983,686
[22] Filed: Dec. 1, 1992
[51] Int. Cl.⁵ .............. H01J 61/30; H01J 5; H01J 16
[52] U.S. Cl. .................. 392/421; 219/383; 219/85.12; 362/261; 362/310; 313/113
[58] Field of Search ............. 392/421, 419; 362/255, 362/256, 261, 262, 267, 310, 293, 294; 313/113, 114, 18, 19, 21, 44–46; 219/85.12, 85.13, 383, 384; 314/136

[56] References Cited

U.S. PATENT DOCUMENTS

| | | | |
|---|---|---|---|
| 3,610,912 | 10/1971 | Schwartz | 240/1.2 |
| 3,621,198 | 11/1971 | Herbrich | 219/85.12 |
| 3,644,768 | 2/1972 | McRae | 313/113 |
| 3,649,811 | 3/1972 | Schoenthaler | 219/85.12 |
| 3,715,615 | 2/1973 | Lavering | 313/204 |
| 3,808,496 | 4/1974 | McRae et al. | 313/113 |
| 4,599,540 | 7/1986 | Roberts | 313/570 |
| 4,633,128 | 12/1986 | Roberts et al. | 313/113 |
| 4,658,179 | 4/1987 | Roberts | 313/113 |
| 5,196,667 | 3/1993 | Gammelin | 219/85.12 |
| 5,260,856 | 11/1993 | Perthus et al. | 362/310 |

FOREIGN PATENT DOCUMENTS 2884 7/1979 European Pat. Off. ......... 392/419
2-14499 2/1992 Japan.

OTHER PUBLICATIONS

DeRobertis et al, "Shaped Aperture Insert", *IBM Technical Disclosure Bulletin*, vol. 22, No. 1, Jun. 1979.
Norman Koch, "The ellipsoidal reflector," *The Electronic Engineer*, Jul. 1976, pp. 56-59.

*Primary Examiner*—Bruce A. Reynolds
*Assistant Examiner*—John A. Jeffery
*Attorney, Agent, or Firm*—Thomas E. Schatzel

[57] ABSTRACT

A portable soldering device comprises a short arc lamp including an alumina ceramic cylindrically shaped body with a concave opening at one end that is plated with silver to form an ellipsoidal reflector, a cathode suspended within the concave opening in opposition to an anode protruding through a hole in the center of the concave opening from the opposite end of the body, a circular iron base that supports the anode at its center and attaches to the body. The soldering device further comprises a cone-shaped hood over the flat window and a supply of inert gas attached to the hood that excludes smoke, residue and splatter from infiltrating the hood.

8 Claims, 3 Drawing Sheets

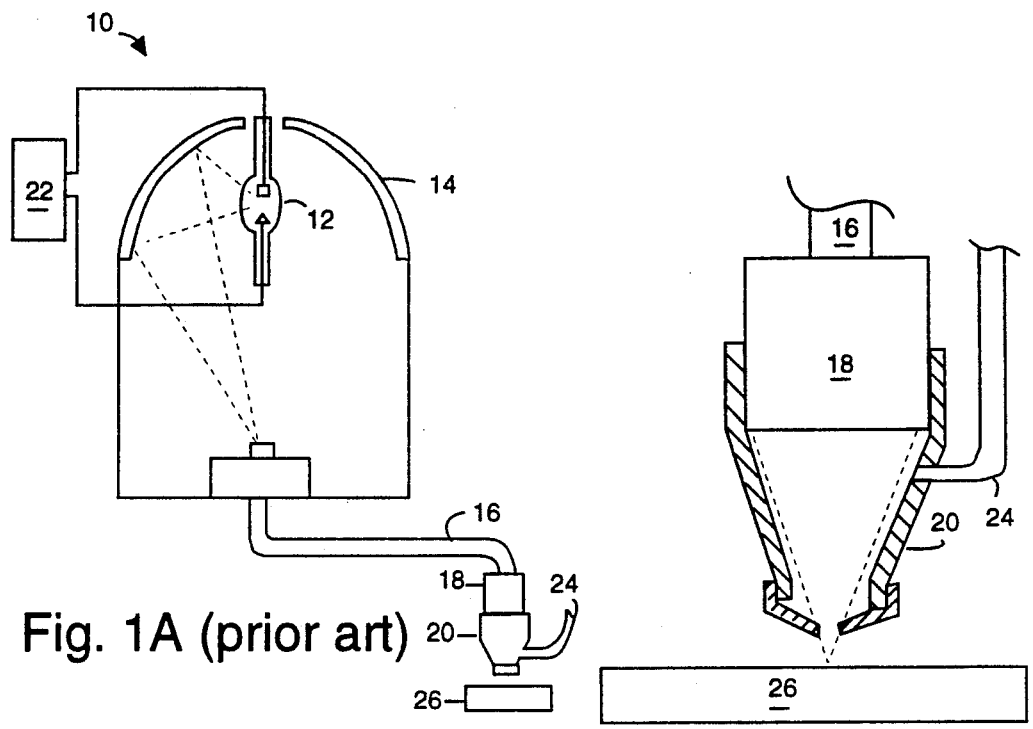
Fig. 1A (prior art)
Fig. 1B (prior art)
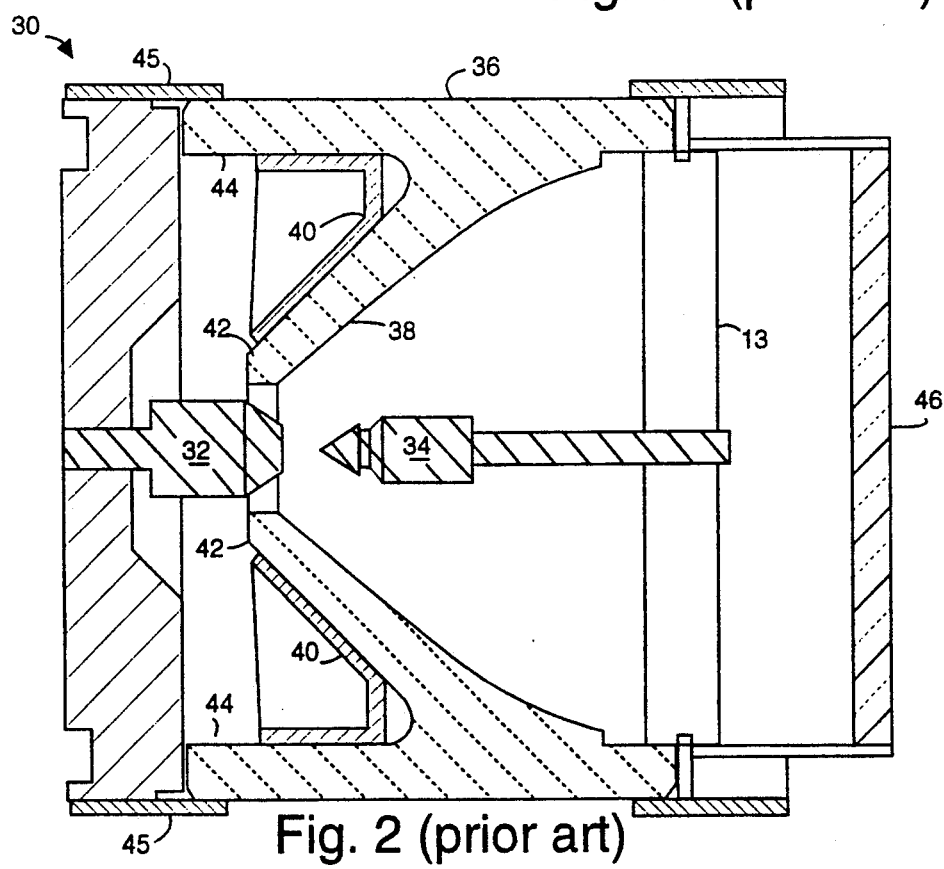
Fig. 2 (prior art)

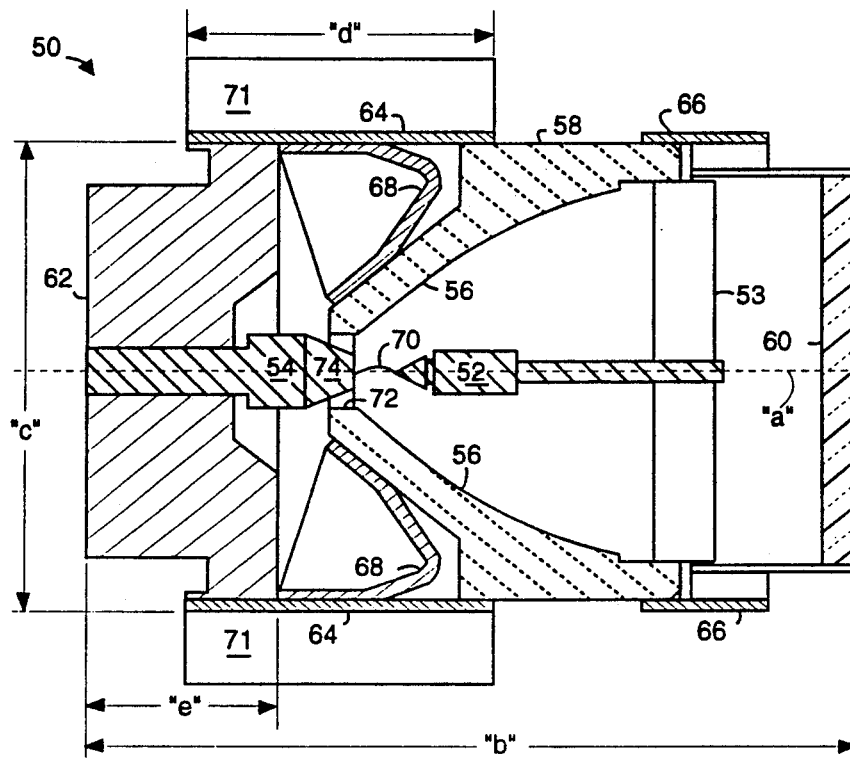
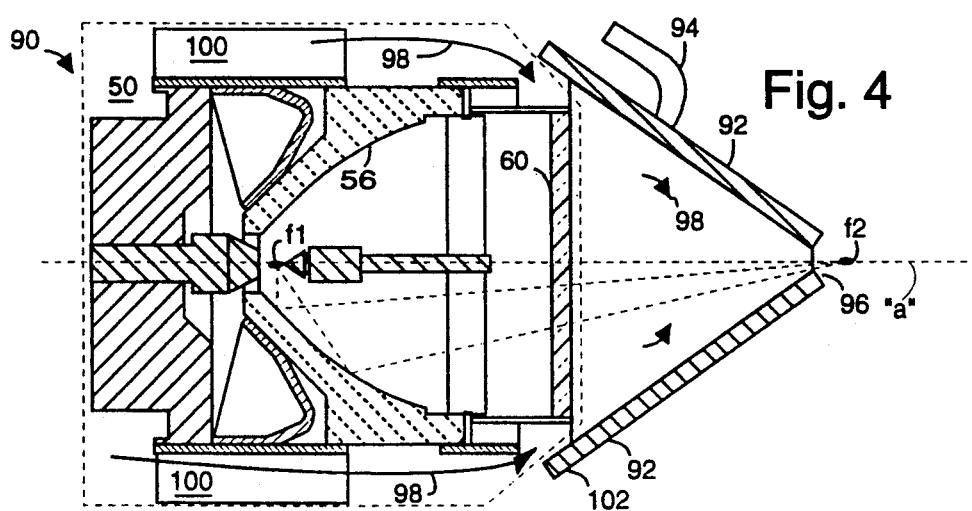

SHORT ARC LAMP SOLDERING DEVICE

BACKGROUND OF THE INVENTION

1. Field of the Invention

The invention relates generally to arc lamps and more specifically to arc lamps useful as soldering tools and in fiber optic bundle illumination applications for medical endoscopes, instrumentation and projection.

2. Description of the Prior Art

Short arc lamps provide intense point sources of light that allow light collection in reflectors for applications in medical endoscopes, instrumentation and projection. Short arc lamps are used in industrial endoscopes for the inspection of jet engine interiors.

Conventional lasers have been used to solder, weld and cut metals. However, lasers powerful enough to do so are also powerful enough to cause serious injury to human operators. Such injury can easily happen when a stray laser beam reflects off the workpiece. It is therefore customary for operators to wear special glasses and shop coats for their protection.

Ordinary light is non-coherent and must be focused to form tight spots of light to have the intensity needed to solder or weld metal. With such a spot of light, there is little danger of injury from misdirected or reflected light, because the non-coherent light will simply scatter in low energy rays.

FIGS. 1A and 1B represent a prior art soldering device 10, based on a conventional arc lamp 12, that is described in Japanese Patent Application 2-14499, filed Feb. 15, 1992, in the Japanese Patent Office, by Makoto Kobayashi, et al. Arc lamp 12 and an external reflector 14 are used to pipe light down a fiber optic cable 16 to an end fitted with a window 18 and a hood 20 for soldering and light-weight welding. The assembly places the arc lamp 12 including a power supply 22, reflector 14 and one end of the fiber optic cable in a housing that remains stationary. A supply of inert gas (not shown) is needed at a remote unit that comprises the other end of the fiber optic cable 16, the window 18, the hood 20 and an inlet in the hood 24 that allows inert gas to fill the hood 20 to exclude smoke, residue and splatter during soldering or welding of a workpiece 26. Integrated short arc lamps are smaller and less bulky than arc lamp 12 and its non-integrated reflector 14.

FIG. 2 illustrates a typical prior art short arc lamp 30 that comprises an anode 32 and a cathode 34 positioned along the longitudinal axis of a cylindrical body 36 with a sealed concave parabolic cavity 38 that contains xenon gas pressurized to several atmospheres. U.S. Pat. No. 4,633,128, issued Dec. 30, 1986, to Roy D. Roberts, the present inventor, and Robert L. Miner, describes such a short arc lamp in which a copper sleeve member 40 is attached to a wall 42 to conduct heat from wall 42 through to an exterior wall 44 and a metal ring 45 with a heat sink (not shown) and eventually to circulating ambient air. A flat glass window 46 seals in the xenon gas.

The prior art soldering apparatuses that use arc lamps for a heat source are too bulky and expensive because a large reflector is needed for a conventional arc lamp to focus a tight beam down a fiber optics cable. A far less bulky and inexpensive short arc lamp based system is needed in the market.

SUMMARY OF THE PRESENT INVENTION

It is therefore an object of the present invention to provide a short arc lamp capable of operating at high power with an elliptical reflector integral to the lamp.

It is a further object of the present invention to provide a soldering device based on a short arc lamp that is simple to manufacture and operate.

Briefly, an embodiment of the present invention is a portable soldering device comprising a short arc lamp including an alumina ceramic cylindrically shaped body with a concave opening at one end that is plated with silver to form an ellipsoidal reflector, a cathode suspended within the concave opening in opposition to an anode protruding through a hole in the center of the concave opening from the opposite end of the body, a circular iron base that supports the anode at its center and attaches to the body. The soldering device further comprises a cone-shaped hood over the flat window and a supply of inert gas attached to the hood that excludes smoke, residue and splatter from infiltrating the hood.

An advantage of the present invention is that a soldering device is provided that provides an instant heat source.

Another advantage of the present invention is that a soldering device is provided that does not emit dangerous laser radiation.

A further advantage of the present invention is that a soldering device is provided that is portable.

These and other objects and advantages of the present invention will no doubt become obvious to those of ordinary skill in the art after having read the following detailed description of the preferred embodiment which is illustrated in the various drawing figures.

IN THE DRAWINGS

FIG. 1A is a diagram of a prior art soldering device with a cutaway of an external reflector to show the paths of typical light rays;

FIG. 1B is a detailed diagram of a hood used in the device of FIG. 1B;

FIG. 2 is a cross-sectional view of a prior art short arc lamp taken along the central axis of the lamp;

FIG. 3 is a cross-sectional view of a cylindrical two kilowatt short arc lamp embodiment of the present invention, taken along the central axis of the lamp;

FIG. 4 is a cross-sectional view of a second soldering and welding device that includes the lamp of FIG. 3.

DETAILED DESCRIPTION OF THE PREFERRED EMBODIMENTS

Figure 5:
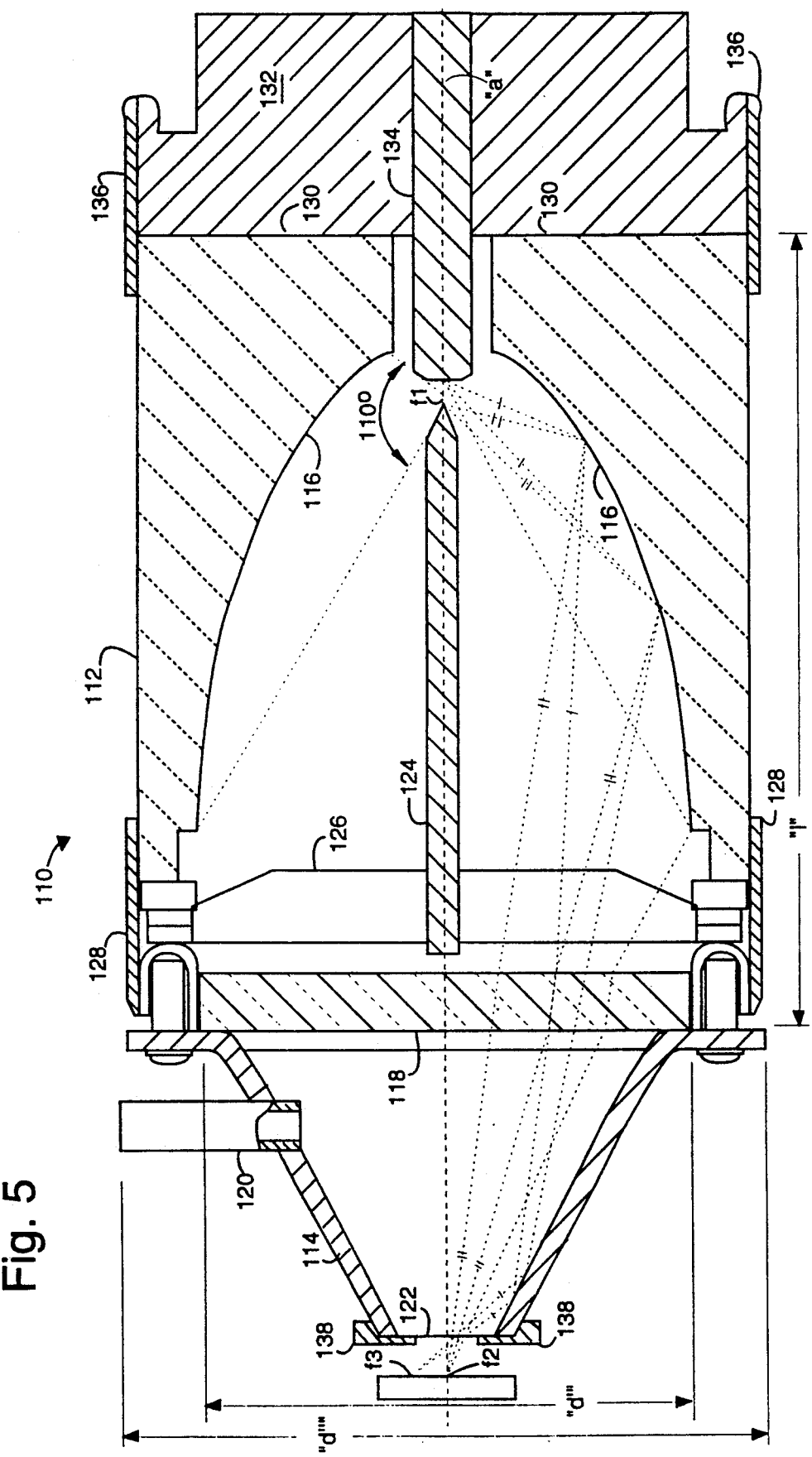
FIG. 5 is a cross sectional view of a lamp embodiment of the present invention with a soldering hood.

FIG. 3 illustrates a short arc lamp embodiment of the present invention, referred to herein by the general reference numeral 50. The lamp 50 comprises a cathode 52, a cathode suspension strut 53, an anode 54, a reflecting concave wall 56 in a ceramic alumina body 58, a flat sapphire window 60, a base 62, a first metal band 64, a second metal band 66 and a copper heat-transfer pad 68 brazed to body 58 behind wall 56 and to first metallic band 64. Reflecting concave wall 56 is symmetric about the longitudinal axis "a" of lamp 50, and is elliptical to form a point focused light output that converges at a point beyond flat window 60. Given "x" as a distance along the central longitudinal axis "a" of lamp 50, and "y" as a radius of wall 56, the elliptical shape is preferably:

$$\frac{x^2}{(1.059)^2} + \frac{y^2}{(0.501)^2} = 1. \quad (1)$$

Reflecting concave wall 56 is plated with silver to provide a highly reflective mirror finish. In operation, an electric arc 70 bridges the gap between cathode 52 and anode 54. Light is generated that is generally more intense at a point along arc 70 near cathode 52.

Heat generated by electric arc 70 is principally conducted away by anode 54 to base 62 and also by passing the heat through body 58, especially wall 56 near anode 54 to copper heat-transfer pad 68 and directly to first metal band 64. The longitudinal length of first metal band 64 is substantially longer than that of the second metal band 66. The length of first metal band 64 bridges a gap between body 58 and base 62 that allows a direct attachment between sleeve 68 and first metal band 64. The heat is more efficiently transferred out of lamp 50 by avoiding a second passage through the material of body 58 which is typically not as heat conductive as metal, especially copper. Prior art lamps, such as lamp 30, for example, do require such a second passage through the ceramic body material.

An air fin heat sink 71 slips over and tightly around first metal band 64 to provide heat sinking to circulating forced air. A second heat path is through anode 54 and base 62 to first metal band 64 and to base 62. Base 62 is sized much thicker than prior art supports (e.g., see FIG. 2) and is therefore able to conduct heat from anode 54 more effectively to base 62 and first metal sleeve 64. Anode 54 is also substantially more massive than anodes in prior art lamps, as exemplified by lamp 30 in FIG. 2. To create more volume for anode 54, the greatest outside diameter of anode 54 is as large or larger than the inside diameter of a hole 72 in reflective wall 56 through which anode 54 accesses cathode 52 to create arc 70. A conical section 74 is incorporated in anode 54 to allow anode 54 to protrude through hole 72 and yet not contact wall 56. The more massive bulk of anode 54, the substantially thicker base 62 and the direct connection of sleeve 68 to first metal band 64 allow lamp 50 to operate at two kilowatts with an adequate air fin heat sink attached to first metal band 64 and sufficient forced air cooling.

For a two-kilowatt implementation of lamp 50, body 58 may have a longitudinal length "b" of 2.625 inches and an outside diameter "c" of 2.625 inches. First metal band 64 would therefore have an inside diameter of approximately 2.625 inches and a longitudinal length "d" of approximately 1.1 inches. Heat sink 71 is preferably sized to contact substantially all of the outside diameter surface of first metal band 64 to assure efficient heat transfer. Base 62, in such an example, would have a thickness "e" of at least 0.8 inches and have an outside diameter compatible with brazing to the inside diameter of first metal band 64. Gap 70 is typically greater than 0.025 inches and less than 0.090 inches. Lamp 50 is filled with a gas, such as xenon, under pressure of several atmospheres.

U.S. Pat. No. 4,633,128 issued to Roberts, et al., on Dec. 30, 1986, describes many details that may be helpful for construction of lamp 50. Therefore, said patent is incorporated herein and made a part of this disclosure.

In view of the lamp 50 illustrated in FIG. 3, there are several alternative embodiments. For example, sleeve 68 may be brazed to reflector 56 and sleeve 64 to lower the thermal resistance through sleeve 68. Base 62 may be comprised of copper, rather than iron, and heat transfer between anode 54 and first metal band 64 would thereby be improved. Appropriate machining and casting of base 62, sleeve 68 and first metal band 64 could be used to support liquid coolant circulation.

FIG. 4 illustrates a soldering and welding device embodiment of the present invention, referred to by the general reference numeral 90. The soldering and welding device 90 comprises short arc lamp 50 and a cone-shaped hood 92. Light generated at a first focus (f1) reflects off reflective wall 56 (FIG. 3), passes through flat window 60 (FIG. 3) and the inside of hood 92 to concentrate at a second focus (f2). Window 60 may be doped with an oxide of metal to prevent ultraviolet rays from reaching f2, which would otherwise produce ozone. Electroplating can also be used followed by rhodium or silver coating to reflect off-focus rays into the working area. A spigot 94 directs air or an inert gas from a gas supply system (not shown) to the space within hood 92 to create positive pressure which will exclude smoke from entering hood 92 from an opening 96. Alternatively, or in addition to spigot 94, a forced air flow 98 directed by a heat sink 100 may be captured by a lip 102 on hood 92 to create a positive air pressure within hood 92 that escapes through opening 96 to exclude smoke. Hood 92 may either be opaque or clear, depending on the application. Alternatively, a disposable pellicle membrane or flat protective window may be placed across opening 96 to exclude smoke. However, material placed here may overheat and discolor and become an obstruction in transmitting power.

Alternatively, devices 80 and 90 may be handheld if an appropriate wand housing is included. A momentary trigger switch may provide intermittent electrical power to lamp 50 through metal bands 64 and 66. A thermal switch attached to lamp 50 may be used to interrupt electrical power when body 58 exceeds a predetermined temperature. Since a number of soldering applications involve very short applications of heat, heatsinks and forced air cooling of lamp 50 may not be required.

FIG. 5 illustrates a lamp assembly embodiment of the present invention, referred to herein by the general reference numeral 110. The lamp 110 comprises short arc lamp 112 and a cone-shaped hood 114. Light generated at a first focus (f1) reflects off an elliptically-shaped reflective wall 116, passes through a flat window 118 and the inside of hood 114 to concentrate at a second focus (f2). Refraction within window 118 causes a shift in focus to other than f2. Window 118 may be doped with an oxide of metal to prevent ultraviolet rays from escaping lamp 112 which would otherwise produce ozone. (Ozone poses potential health problems and its smell is objectionable.) A spigot 120 directs air or an inert gas from a gas supply system (not shown) to the space within hood 114 to create positive pressure which will exclude smoke from entering hood 114 from an opening 122. Lamp 112 further comprises a cathode 124, a cathode support 126, a cathode electrical contact 128, a ceramic body 130, a base 132, an anode 134 and an anode electrical contact 136.

The size of opening 122 will dictate how much energy is able to pass from lamp 110 to a workpiece. Opening 112 may be either a fixed or a variable aperture, depending on the needs of a particular application.

A thread may be provided at the tip of hood 114 to allow a different sized opening 122 in a ring 138 to be screwed on by a user to adjust the power level delivered to a workpiece at f2. The energy may also be controlled by varying the power applied to lamp 110.

Light generated closer to cathode 124 at f1 will more precisely concentrate at f2 than will light that is generated closer to anode 134. If the inner surfaces of hood 114 are reflective, such off-focus light may be made to concentrate at a third focus (f3), near f2. Thus more energy can be concentrated on a workpiece. Therefore, hood 114 preferably has a mirror inside surface and the slope of the sides of hood 114 is chosen to bring f3 near f2.

The elliptical shape of reflective wall 116 permits collection angles as great as 110°. Typical prior art lamps have collection angles that are much less, e.g., 60°. The elliptical shape results in less mechanical interference by cathode 124 and anode 134. Such a 50° improvement in collection angle in the present invention allows much more light produced at f1 to reach f2 and f3. This, in turn, permits higher power concentrations and lower wattages for lamp 112 to be used in a range of applications, such as soldering. Lamp 112 is typically operated at 200-400 watts. In a typical implementation, the overall length "1" from window 118 to base 132 is 2.125 inches. Window 118 has a diameter "d'" of one inch and is preferably comprised of sapphire or quartz fused silica. Hood 114 rises half an inch and has sides that incline 30° from a perpendicular to window 118. The overall diameter "d''" of hood 114 is 1.45 inches. Spigot 120 is one-eighth inch metal tubing brazed to hood 114. Reflective wall 116 is a bisque fired glazed surface on ceramic body 130 and is silvered. The glazed ellipse conforms to formula (1). Body 130 preferably comprises 94% alumina oxide ($Al_2O_3$) and has an overall length of 1.325 inches. In operation, a radially finned heat sink is preferably attached to cathode electrical contact 128 and another heatsink to anode electrical contact 136 to draw heat away from lamp 112.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A short arc lamp, comprising:

a generally cylindrical body formed of ceramic having a concave cavity formed therein defining a curved, ellipsoidal reflecting wall that is symmetrical about a central axis of the lamp;

a flat window sealed across the mouth of said concave cavity for keeping a pressurized gas within said cavity;

a pair of electrodes mounted within said cavity to extend along said central axis with distal ends of said electrodes being spaced apart a distance to form a short arc gap at a first focal point of said curved ellipsoidal reflecting wall and a second focal point outside of the flat window and proximate to the lamp;

a metal ring sealed to the cylindrical body at the end opposite to said mouth of said concave cavity;

a metal base sealed to the metal ring at an end opposite to that attached to the cylindrical body such that a separation exists between the metal base and the cylindrical body;

a contact area on the cylindrical body proximate said reflecting wall and said short arc gap and in thermal communication with said arc gap; and heat transfer means for conducting heat from the contact area directly to the metal ring at a plurality of points along the inside surface of the metal ring between the metal base and the cylindrical body.

2. The lamp of claim 1, wherein:

the flat window comprises doping for reducing ultraviolet transmission wherein ozone generation is reduced thereby.

3. The lamp of claim 1, wherein:

said ellipsoidal reflecting wall has a shape that substantially conforms to:

$$\frac{x^2}{(1.059)^2} + \frac{y^2}{(0.501)^2} = 1.$$

4. The lamp of claim 1, further including:

aperture means for restricting how much energy may be transmitted from the short arc lamp to said second focal point.

5. The lamp of claim 4, wherein:

the aperture means includes means for changing a diameter of an opening through which said energy must pass.

6. A short-arc lamp, comprising:

a cylindrical body including a first and a second metal band for electrical power input and for contact with heat sinking means;

arc generating means comprising an anode mounted in a metallic base connected to a first metallic ring and a cathode for producing an intense source of light disposed near a central axis of the cylindrical body;

ellipsoidal light reflecting means disposed within the cylindrical body and around said central axis for collecting at least 110° of light from the arc generating means to an external point of focus proximate to the lamp; and heat transfer means connected to conduct heat from the ellipsoidal light reflecting means across a gap in the cylindrical body outwardly to said first metal ring for increased lamp heat dissipation and which comprises a copper pad brazed at one end to said first metal ring and at a second end to the ellipsoidal light reflecting means.

7. A short-arc lamp, comprising:

a cylindrical body including a first and a second metal band for electrical power input and heat sinking means contact;

arc generating means disposed near a central axis of the cylindrical body for producing an intense source of light;

ellipsoidal light reflecting means disposed within the cylindrical body and around said central axis for collecting an arc of at least 110° of light from the arc generating means to an external point of focus proximate to the lamp;

a flat sapphire window sealed to the cylindrical body and including a metal oxide doping for reducing ultraviolet emissions from the lamp during operation; and xenon gas under pressure which is contained by said flat sapphire window.

8. A short-arc lamp device, comprising:

a generally cylindrical body formed of ceramic with a curved, ellipsoidal reflecting wall on a concave cavity that is symmetrical about a central axis of the device.

a flat window sealed across a mouth of said concave cavity for keeping a pressurized gas within said cavity;

a pair of electrodes mounted within said cavity that extend along said central axis with distal ends of said electrodes forming a short arc gap at a first focal point of said curved ellipsoidal reflecting wall with a corresponding second focal point being located proximate to the lamp opposite of the flat window;

a metal ring sealed to the cylindrical body at an end opposite to said mouth of said concave cavity;

a metal base sealed to the metal ring at an end opposite to that attached to the cylindrical body wherein a separation exists between the metal base and the cylindrical body;

a contact area on the cylindrical body proximate said reflecting wall and said short arc gap and in thermal communication said arc gap;

heat transfer means connected to conduct any heat from the contact area outwardly to a plurality of points along an inside surface of the metal ring and positioned between the metal base and the cylindrical body; and a cone-shaped hood attached to the cylindrical body and having a lip for trapping any air flow that flows passed the cylindrical body and for directing said air flow out through an opening located short of said second focal point.

* * * * *